United States Patent
Kurapati et al.

(10) Patent No.: US 11,975,667 B2
(45) Date of Patent: May 7, 2024

(54) METHOD FOR ADAPTING A TRIGGERING ALGORITHM OF A PERSONAL RESTRAINT DEVICE AND CONTROL DEVICE FOR ADAPTING A TRIGGERING ALGORITHM OF A PERSONAL RESTAINT DEVICE

(71) Applicant: Continental Automotive GmbH, Hannover (DE)

(72) Inventors: V S Mani Kishore Kurapati, Bangalore (IN); Sudhir Behani, Bangalore (IN); Vishal Muralidharan, Bangalore (IN)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 17/642,106

(22) PCT Filed: Nov. 12, 2019

(86) PCT No.: PCT/EP2019/081061
§ 371 (c)(1),
(2) Date: Mar. 10, 2022

(87) PCT Pub. No.: WO2021/047786
PCT Pub. Date: Mar. 18, 2021

(65) Prior Publication Data
US 2023/0356682 A1  Nov. 9, 2023

(30) Foreign Application Priority Data
Sep. 11, 2019  (IN) .............. 201941036626

(51) Int. Cl.
*B60R 21/013* (2006.01)
*B60R 21/015* (2006.01)
*B60R 21/01* (2006.01)

(52) U.S. Cl.
CPC ...... *B60R 21/01552* (2014.10); *B60R 21/013* (2013.01); *B60R 21/01538* (2014.10);
(Continued)

(58) Field of Classification Search
CPC ........ B60R 21/01552; B60R 21/01538; B60R 21/013; B60R 2021/01265; B60R 2021/01315
See application file for complete search history.

(56) References Cited

U.S. PATENT DOCUMENTS 6,609,054 B2    8/2003    Wallace
6,889,215 B2    5/2005    Basir et al.
(Continued)

FOREIGN PATENT DOCUMENTS

EP    1065097 A1    1/2001
EP    1632403 A1    3/2006
(Continued)

OTHER PUBLICATIONS

International Search Report and Written Opinion dated Jun. 9, 2020 from corresponding International patent application No. PCT/EP2019/081061.

*Primary Examiner* — Mathew Franklin Gordon

(57) ABSTRACT

A method for adapting a triggering algorithm of a personal restraint device of a vehicle on the basis of a detected vehicle interior state of the vehicle. The method comprises detecting of key points of a vehicle occupant by an optical sensor device, ascertaining a vehicle occupant posture of the vehicle occupant based on the connection of the detected key points to a skeleton-like representation of body parts of the vehicle occupant, wherein the skeleton-like representation reflects the relative position and orientation of individual body parts of the vehicle occupant, predicting a future vehicle occupant posture of the vehicle occupant based on a predicted future position of at least one of the key points, and (Continued)

modifying the triggering algorithm of the personal restraint device based on the predicted future posture of the vehicle occupant. A control device for adapting a triggering algorithm of a personal restraint device is also disclosed.

15 Claims, 2 Drawing Sheets

(52) U.S. Cl.
CPC .............. *B60R 2021/01265* (2013.01); *B60R 2021/01315* (2013.01)

(56) References Cited

U.S. PATENT DOCUMENTS

| | | |
|---|---|---|
| 2004/0006427 A1 | 1/2004 | Stiller |
| 2006/0042851 A1 | 3/2006 | Herrmann et al. |
| 2007/0055427 A1 | 3/2007 | Sun et al. |
| 2017/0313271 A1 | 11/2017 | Pena Casimiro et al. |

FOREIGN PATENT DOCUMENTS

| | | |
|---|---|---|
| EP | 2987688 A1 | 2/2016 |
| GB | 2500690 A | 10/2013 |
| WO | 03002366 A1 | 1/2003 |
| WO | 2009131875 A2 | 10/2009 |
| WO | 2019081206 A1 | 5/2019 |

METHOD FOR ADAPTING A TRIGGERING ALGORITHM OF A PERSONAL RESTRAINT DEVICE AND CONTROL DEVICE FOR ADAPTING A TRIGGERING ALGORITHM OF A PERSONAL RESTAINT DEVICE

CROSS REFERENCE TO RELATED APPLICATIONS

This U.S. patent application claims the benefit of PCT patent application No. PCT/EP2019/081061 filed on Nov. 12, 2019, which claims the benefit of Indian patent application No. 201941036626, filed Sep. 11, 2019, both of which are hereby incorporated by reference.

TECHNICAL FIELD

The technical field relates to a method for adapting a triggering algorithm of a personal restraint device of a vehicle on the basis of a detected vehicle interior state of the vehicle. The technical field further relates to a control device for adapting a triggering algorithm of a personal restraint device of a vehicle on the basis of a detected vehicle interior state of the vehicle.

BACKGROUND

For many years, personal protective devices such as a crash protection system designed as a personal restraint device have been known in vehicles which is intended to protect vehicle occupants in the event of a collision or crash, with the aim of preventing injuries to the occupants as far as possible or at least reducing their severity. Usually, an airbag is used as a personal restraint device, which catches the occupant in the event of a crash. The airbag deploys and unfolds through the inflowing fluid within a short time range between 10 ms and 50 ms between an occupant and parts of an interior of the vehicle and forms a cushion, preventing the occupant from colliding with hard parts of the vehicle interior such as a steering wheel.

Moreover, at the present time, vehicle occupant recognition in a vehicle generally takes place using sensors that are installed in the vehicle seats. These sensors are designed for carrying out occupant recognition with the aid of mass estimation. In addition, via so-called seat belt buckles it is recognized whether or not a vehicle occupant is wearing his/her seat belt while traveling.

The known restraint devices are generally designed in such a way that a maximum possible protection for the vehicle occupants is given only when the vehicle occupants assume a predetermined position. If the vehicle occupants no longer assume this predetermined position, a protective effect of the restraint device could be reduced. The vehicle occupants would then no longer be optimally protected during a collision.

Moreover, due to semiautomated or automated driving, more and more occupants will be interacting with objects in a vehicle during a trip, such as laptops, mobile phones, tablet PCs, and/or musical instruments and will hold such or other mobile objects in their hands.

For example, if the driver's hand is on the steering wheel and occluding the steering wheel airbag or is placed on top of the airbag area, in case of an airbag deployment it is possible, that the driver will be injured by his own hand or by a mobile object held in his hand.

In order to maximize occupant protection during a collision and to reduce the risk of injury, it is desirable to vary the deployment characteristics of the airbag or operating characteristics of other personal restraint components based on the detected vehicle interior state of the vehicle. Specifically, it is desirable to control factors such as the inflation profile and deployment timing of the airbag depending upon the position and/or posture of the occupant in a seat.

SUMMARY

In view of the foregoing, it is an object of the present disclosure to provide a method and a control device for adapting a triggering algorithm of a personal restraint device of a vehicle on the basis of a detected vehicle interior state of the vehicle, which ensure an accurate determination of the interior state and thus enable good protection of the occupant in the event of the restraint device being triggered.

According to one aspect, a method for adapting a triggering algorithm of a personal restraint device of a vehicle on the basis of a detected vehicle interior state of the vehicle is provided. The method comprises detecting of key points of a vehicle occupant by an optical sensor device, ascertaining a vehicle occupant posture of the vehicle occupant based on the connection of the detected key points to a skeleton-like representation of body parts of the vehicle occupant, wherein the skeleton-like representation reflects the relative position and orientation of individual body parts of the vehicle occupant, predicting a future vehicle occupant posture of the vehicle occupant based on a predicted future position of at least one of the key points; and modifying the triggering algorithm of the personal restraint device based on the predicted future posture of the vehicle occupant.

The disclosure is based on the consideration that the very accurate determination of the vehicle interior state can be achieved by detecting key points of a vehicle occupant by an optical sensor device and by ascertaining a vehicle occupant posture based on the connection of the detected key points to a skeleton-like representation of body parts of the vehicle occupant, wherein the skeleton-like representation reflects the relative position and orientation of individual body parts of the vehicle occupant. The disclosure is further based on the consideration that a maximization of protection of the vehicle occupant in the event of a collision or crash can be reached by estimating the future vehicle occupant posture, particularly shortly before or at the time of the collision or crash, based on a predicted future position of at least one of the key points for at least the next few micro seconds and by modifying the triggering algorithm of the personal restraint device based on this predicted future posture of the vehicle occupant.

In accordance with the present disclosure an accurate determination of the interior state is ensured and thus maximum protection of the vehicle occupant in the event of the restraint device being triggered is enabled.

In one embodiment of the method, the method further comprises detecting of a mobile object held by the vehicle occupant by the optical sensor device, predicting a future mobile object state, and modifying the triggering algorithm of the personal restraint device based on the predicted future posture of the vehicle occupant and the predicted future mobile object state.

In this way, also a mobile object held by the vehicle occupant is taken into account and so a more accurate determination of the vehicle interior state and therefore further maximization of protection of the vehicle occupant in the event of a collision or crash can be reached.

In one embodiment of the method, the predicted future mobile object state comprises at least one of a future position of the mobile object inside the vehicle interior, a future velocity of the mobile object, or a future orientation of the mobile object. The position of the mobile object inside the vehicle is described as the position of the mobile object relative to the personal restraint device and/or the steering wheel. The predicted future mobile object state preferably comprises the future position of the mobile object inside the vehicle interior, the future velocity of the mobile object, and the future orientation of the mobile object. Based on these parameters, a very accurate state of the mobile object can be described and used for modifying the triggering algorithm which contributes to a further increase in security and protection.

In one embodiment of the method, the method further comprises correlating the position and/or movement of the mobile object with respect to the position and/or movement of the key points representing the vehicle occupant wrists, and determining from the correlation which hand of the vehicle occupant is holding the mobile object.

Such a determining of the hand that holds the object, is well suited for more accurate description of the vehicle interior state and an even more appropriate modification of the triggering algorithm.

In one embodiment of the method, the predicted future position of at least one of the key points is estimated based on at least one of a vehicle occupant size, a vehicle occupant seat position, a vehicle occupant seat backrest angle, a seat belt status, a vehicle velocity, or a vehicle acceleration. The vehicle occupant size is estimated based on the size of a body part, particularly a limb, of the vehicle occupant.

In one embodiment of the method, the predicted future state of the mobile object is estimated based on at least one of a vehicle occupant size, a vehicle occupant seat position, a vehicle occupant seat backrest angle, a seat belt status, a vehicle velocity, or a vehicle acceleration. The vehicle occupant size is estimated based on the size of a body part, particularly a limb, of the vehicle occupant.

In one embodiment of the method, the predicted future position of at least one of the key points is estimated based on a calculated future vectorial key point velocity, wherein the future vectorial key point velocity is formed by a vector sum of an estimated future vectorial key point velocity and a current vectorial vehicle velocity multiplied with a first scalar parameter derived from a signal of a crash sensor. This will enable dynamic key point tracking and particularly precise predicting of the future key point position and therefore precise predicting a future vehicle occupant posture. The crash sensor can be an acceleration sensor, an angular rate sensor or an impact or contact sensor such as a pressure sensor or a combination of one or more of these sensors. Particularly, the first scalar parameter can be determined by also taking into account vehicle data like vehicle size and vehicle weight.

In one embodiment of the method, the future vectorial key point velocity is calculated by the following formula:

$$\overrightarrow{v_{KPt_{n+1}}} = \overrightarrow{v_{KPt_{n+1}Est}} + (\alpha)*\overrightarrow{v_{Vehicle}} + (\beta)*\overrightarrow{v_{CT}},$$

wherein $\overrightarrow{v_{KPt_{n+1}}}$ is the future vectorial key point velocity, $\overrightarrow{v_{KPt_{n+1}Est}}$ is the estimated future vectorial key point velocity, ($\alpha$) is the first scalar parameter derived from a signal of a crash sensor, $\overrightarrow{v_{Vehicle}}$ is the current vectorial vehicle velocity, ($\beta$) is a second scalar parameter derived from a signal of a crash sensor and $\overrightarrow{v_{CT}}$ is a current vectorial colliding target velocity.

In this way, the determination of the future vectorial key point velocity particularly further takes into account the current vectorial colliding target velocity multiplied with a second scalar value parameter derived from a signal of a crash sensor. Particularly in the case of a collision the predicting of the future vehicle occupant posture will be further precisionized in this way.

Thereby, the colliding target is an object with which the vehicle collides, wherein the colliding target can be a stationary object or a moving object in the surroundings of the vehicle. So, the colliding target for example can be another vehicle, a bicycle, a motorcycle, a pedestrian, a crash barrier, a street lamp or a tree. For a stationary object, the current vectorial colliding target velocity usually is zero. The vectorial colliding target velocity particularly can be derived from a signal of a surrounding sensor of the vehicle, like a radar sensor, a lidar sensor, an ultrasonic sensor or a surrounding camera. The second scalar value parameter can, for example, be derived from another signal of the same crash sensor from which the first scalar parameter is derived or from the same signal of the same crash sensor from which the first scalar parameter is derived. However, the second scalar value parameter, for example, also can be derived from another crash sensor, wherein this other crash sensor preferably can be an acceleration sensor, an angular rate sensor or an impact or contact sensor such as a pressure sensor or a combination of one or more of these sensors. Particularly, the second scalar parameter can be determined by also taking into account vehicle data like vehicle size and vehicle weight.

In one embodiment of the method, the predicted future position of the mobile object is estimated based on a calculated future vectorial mobile object velocity, wherein the future vectorial mobile object velocity is formed by a vector sum of an estimated vectorial mobile object velocity and a current vectorial vehicle velocity multiplied with a first scalar parameter derived from a signal of a crash sensor. This will enable dynamic mobile object tracking and particularly precise predicting of the future mobile object position. The crash sensor preferably can be an acceleration sensor, an angular rate sensor or an impact or contact sensor such as a pressure sensor or a combination of one or more of these sensors. Particularly, the first scalar parameter can be determined by also taking into account vehicle data like vehicle size and vehicle weight.

In one embodiment of the method, the future vectorial mobile object velocity is calculated by the following formula:

$$\overrightarrow{v_{Obj t_{n+1}}} = \overrightarrow{v_{Obj t_{n+1}Est}} + (\alpha)*\overrightarrow{v_{Vehicle}} + (\beta)*\overrightarrow{v_{CT}},$$

wherein $\overrightarrow{v_{Obj t_{n+1}}}$ is the future vectorial mobile object velocity, $\overrightarrow{v_{KPt_{n+1}Est}}$ is the estimated future vectorial mobile object velocity, ($\alpha$) is the first scalar parameter derived from a signal of a crash sensor, $\overrightarrow{v_{vehicle}}$ is the current vectorial vehicle velocity, ($\beta$) is a second scalar parameter derived from a signal of a crash sensor and $\overrightarrow{v_{CT}}$ is a current vectorial colliding target velocity.

In this way, the determination of the future vectorial mobile object velocity particularly further takes into account the current vectorial colliding target velocity multiplied with a second scalar value parameter derived from a signal of a crash sensor. Particularly in the case of a collision the predicting of the future mobile object position will be further precisionized in this way.

Thereby, the colliding target is an object with which the vehicle collides, wherein the colliding target can be a stationary object or a moving object in the surroundings of the vehicle. So, the colliding target for example can be another vehicle, a bicycle, a motorcycle, a pedestrian, a crash barrier, a street lamp or a tree. For a stationary object, the current vectorial colliding target velocity usually is zero. The vectorial colliding target velocity particularly can be derived from a signal of a surrounding sensor of the vehicle, like a radar sensor, a lidar sensor, an ultrasonic sensor or a surrounding camera. The second scalar value parameter can, for example, be derived from another signal of the same crash sensor from which the first scalar parameter is derived or from the same signal of the same crash sensor from which the first scalar parameter is derived. However, the second scalar value parameter, for example, also can be derived from another crash sensor, wherein this other crash sensor preferably can be an acceleration sensor, an angular rate sensor or an impact or contact sensor such as a pressure sensor or a combination of one or more of these sensors. Particularly, the second scalar parameter can be determined by also taking into account vehicle data like vehicle size and vehicle weight.

In one embodiment of the method, the detecting of key points of the vehicle occupant is made in using at least an IR camera and a 3D camera. The IR camera uses infrared emitters in order to reliably recognize and detect the vehicle interior state at night as well. The 3D camera preferably operates according to the time of flight method and allows detection of the vehicle interior state based on actual movement vectors in three-dimensional space. Preferably the 3D camera and the IR camera are interior cameras situated in the vehicle, wherein the 3D camera and the IR camera particularly are integrated in the roof lining between the vehicle front seats and/or in an area close to the rear-view mirror. Particularly, the 3D camera and the IR camera can form a single structural camera unit.

In one embodiment of the method, 2D key points of the vehicle occupant detected by the IR camera are converted into 3D key points of the vehicle occupant by fusing the information provided by the 3D camera. Preferably, the ascertaining of the vehicle occupant posture of the vehicle occupant is based on the 3D key points of the vehicle occupant.

In one embodiment of the method, the detecting of the mobile object held by the vehicle occupant is made in using only the IR camera.

In one embodiment of the method, the key points of the vehicle occupant are the vehicle occupant skeleton joints. Such key points allow a very accurate ascertaining of the vehicle occupant posture since they are highly relevant and informative regarding the position, orientation and movement of individual body parts.

According to another aspect, a control device for adapting a triggering algorithm of a personal restraint device of a vehicle on the basis of a detected vehicle interior state of the vehicle is configured to detect key points of a vehicle occupant by an optical sensor device, ascertain a vehicle occupant posture of the vehicle occupant based on the connection of the detected key points to a skeleton-like representation of body parts of the vehicle occupant, wherein the skeleton-like representation reflects the relative position and orientation of individual body parts of the vehicle occupant, predict a future vehicle occupant posture of the vehicle occupant based on a predicted future position of at least one of the key points, and modify the triggering algorithm of the personal restraint device based on the predicted future posture of the vehicle occupant.

The embodiments described for the method also apply accordingly to the control device. Other aspects and advantages will become apparent upon consideration of the following detailed description and the attached drawings wherein like numerals designate like structures throughout the specification.

BRIEF DESCRIPTION OF THE DRAWINGS

The present disclosure will become more fully understood from the detailed description and the accompanying drawings, wherein.

DETAILED DESCRIPTION

The following describes the present disclosure in detail with reference to the accompanying drawings and in combination with embodiments. It should be noted that, without conflicts, the embodiments in the present disclosure and features in the embodiments may be combined with each other. Parts corresponding to each other are always provided with the same reference signs in all figures.

Figure 1:
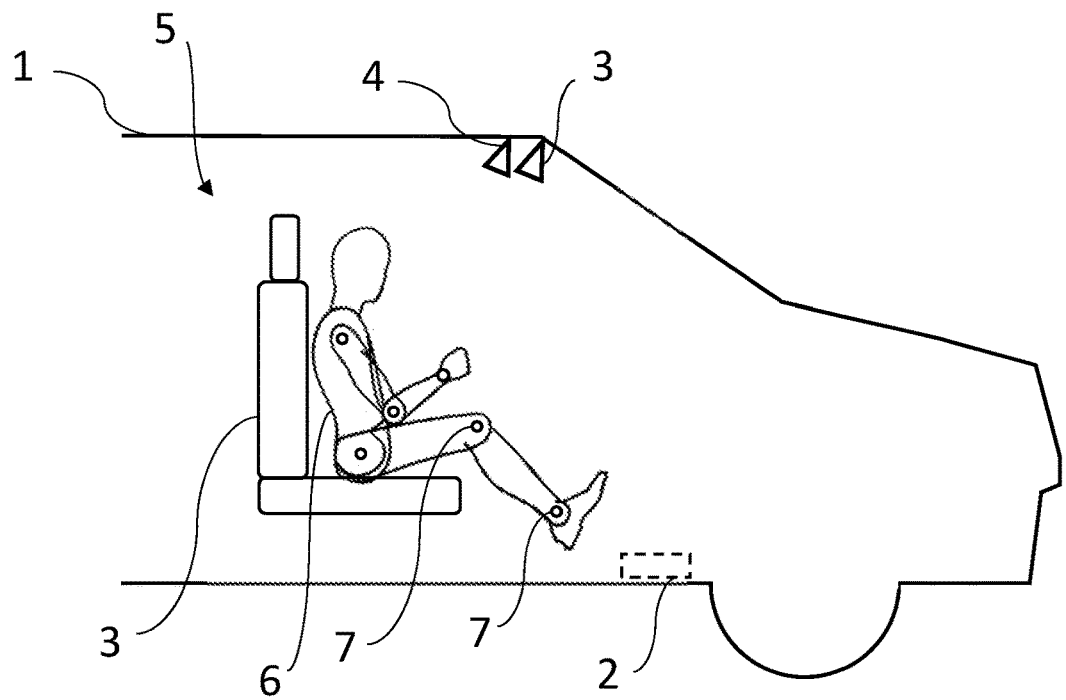
FIG. 1 shows in a schematic diagram a vehicle comprising a control device for adapting a triggering algorithm of a personal restraint device based on a detected vehicle interior state.

FIG. 1 shows in a schematic diagram a vehicle 1 comprising a control device 2 for adapting a triggering algorithm of a personal restraint device (not shown) of the vehicle 1 on the basis of a detected vehicle interior state. The vehicle 1 comprises as an optical sensor device a 3D camera 3 and an IR camera 4, wherein the 3D camera 3 and the IR camera 4 are integrated in the roof lining between the vehicle front seats 3 and in an area close to the rear-view mirror of the vehicle 1, and wherein these cameras 3, 4 monitor the interior 5 of the vehicle 1. The vehicle 1 further comprises a surrounding sensor (not shown), like a radar sensor, a lidar sensor, an ultrasonic sensor or a surrounding camera or a combination thereof and at least one collision sensor (not shown).

The control device 2 is configured to detect the skeleton joints of a vehicle occupant 6 as key points 7 of the vehicle occupant 6 by the cameras 3, 4. Thereby, 2D key points of the vehicle occupant 6 detected by the IR camera 4 are converted into 3D key points 7 of the vehicle occupant 6 by fusing the information provided by the 3D camera 3. In FIG. 1 only individual key points 7 are provided with the reference sign 7 in order not to overload the illustration. Based on these key points 7 a vehicle occupant posture of the vehicle occupant 6 based on the connection of the detected key points 7 to a skeleton-like representation of body parts of the vehicle occupant 6 is ascertained, wherein the skeleton-like representation reflects the relative position and orientation of individual body parts of the vehicle occupant 6.

The control device 2 is further configured to predict a future vehicle occupant posture of the vehicle occupant 6 based on a predicted future position of at least one of the key points 7 and to modify the triggering algorithm of the personal restraint device based on the predicted future posture of the vehicle occupant 6.

Figure 2:
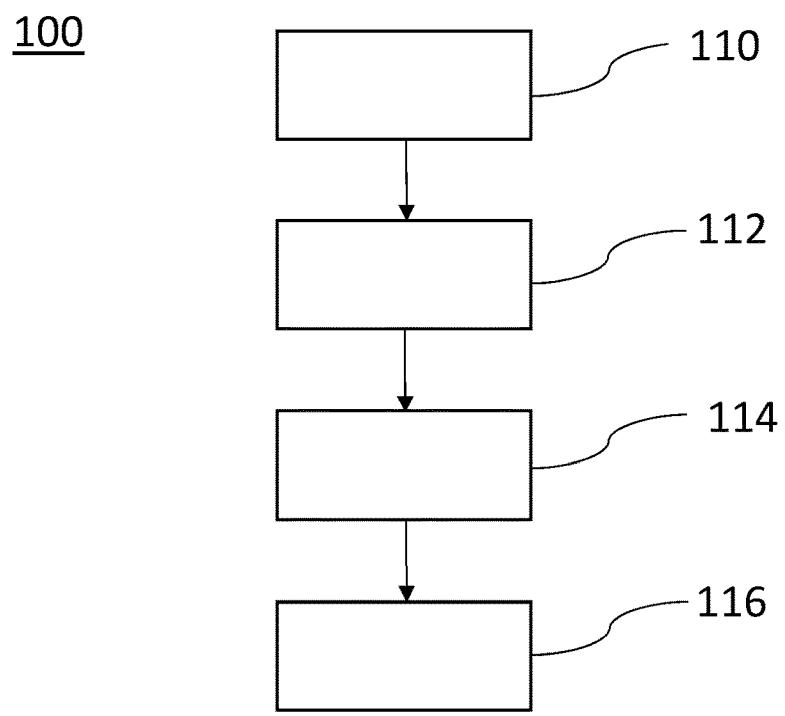
FIG. 2 shows a flow chart for adapting a triggering algorithm of a personal restraint device carried out by the control device of FIG. 1.

The method 100 carried out by the control device 2 is shown and described in more detail in FIG. 2.

FIG. 2 shows a flow chart of a method 100 for adapting a triggering algorithm of a personal restraint device of the vehicle 1 shown in FIG. 1 on the basis of a detected vehicle interior state of the vehicle 1, wherein the vehicle 1 collides or will collide with a colliding target, and wherein the colliding target is a moving target vehicle. In step 110 key points 7 of the vehicle occupant 6 are detected by the optical sensor device, wherein the optical sensor device is the combination of the IR camera 4 and the 3D camera 3, and wherein 2D key points of the vehicle occupant 6 detected by the IR camera 4 are converted into 3D key points 7 of the vehicle occupant 6 by fusing the information provided by the 3D camera 3.

In step 112 a vehicle occupant posture of the vehicle occupant 6 is ascertained based on the connection of the detected key points 7 to a skeleton-like representation of body parts of the vehicle occupant 6, wherein the skeleton-like representation reflects the relative position and orientation of individual body parts of the vehicle occupant 6.

In step 114 a future vehicle occupant posture of the vehicle occupant 6 is predicted based on a predicted future position of at least one of the key points 7. The predicted future position of at least one of the key points 7 is estimated based on a calculated future vectorial key point velocity, wherein the future vectorial key point velocity is formed by a vector sum of an estimated vectorial key point velocity, a current vectorial vehicle velocity multiplied with a first scalar parameter derived from a signal of a crash sensor and a current vectorial colliding target velocity multiplied with a second scalar parameter derived from a signal of the same crash sensor. In this way, the future vectorial key point velocity is calculated by the following formula:

$$\overrightarrow{v_{KPt_{n+1}}} = \overrightarrow{v_{KPt_{n+1Est}}} + (\alpha) * \overrightarrow{v_{Vehicle}} + (\beta) * \overrightarrow{v_{CT}},$$

wherein $\overrightarrow{v_{KPt_{n+1}}}$ is the future vectorial key point velocity, $\overrightarrow{v_{KPt_{n+1Est}}}$ is the estimated future vectorial key point velocity, ($\alpha$) is the first scalar parameter derived from a signal of a crash sensor, $\overrightarrow{v_{Vehicle}}$ is the current vectorial vehicle velocity, ($\beta$) is the second scalar parameter derived from a signal of the crash sensor and $\overrightarrow{v_{CT}}$ is a current vectorial colliding target velocity.

The first scalar parameter and the second scalar parameter are each determined by also taking into account the vehicle size and the vehicle weight of the vehicle 1. The vectorial colliding target velocity is derived from a signal of a surrounding sensor of the vehicle 1, like a radar sensor, a lidar sensor, an ultrasonic sensor or a surrounding camera.

This will enable dynamic key point tracking and particularly precise predicting of the future key point position and therefore precise predicting a future vehicle occupant posture.

In step 116 the triggering algorithm of the personal restraint device is modified based on the predicted future posture of the vehicle occupant 6.

Thus, an accurately determination of the interior state is ensured and thus maximum protection of the vehicle occupant 6 in the event of the restraint device being triggered is enabled.

Figure 3:
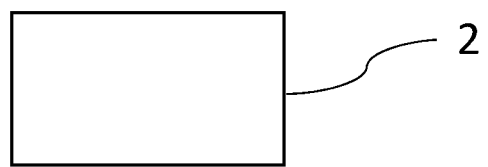
FIG. 3 shows a control device for adapting a triggering algorithm of a personal restraint device of FIG. 2.

FIG. 3 shows the control device 2 for adapting a triggering algorithm of a personal restraint device of a vehicle 1 on the basis of a detected vehicle interior state of the vehicle 1. The control device 2 is configured or designed for carrying out the method 100 according to FIG. 2.

Figure 4:
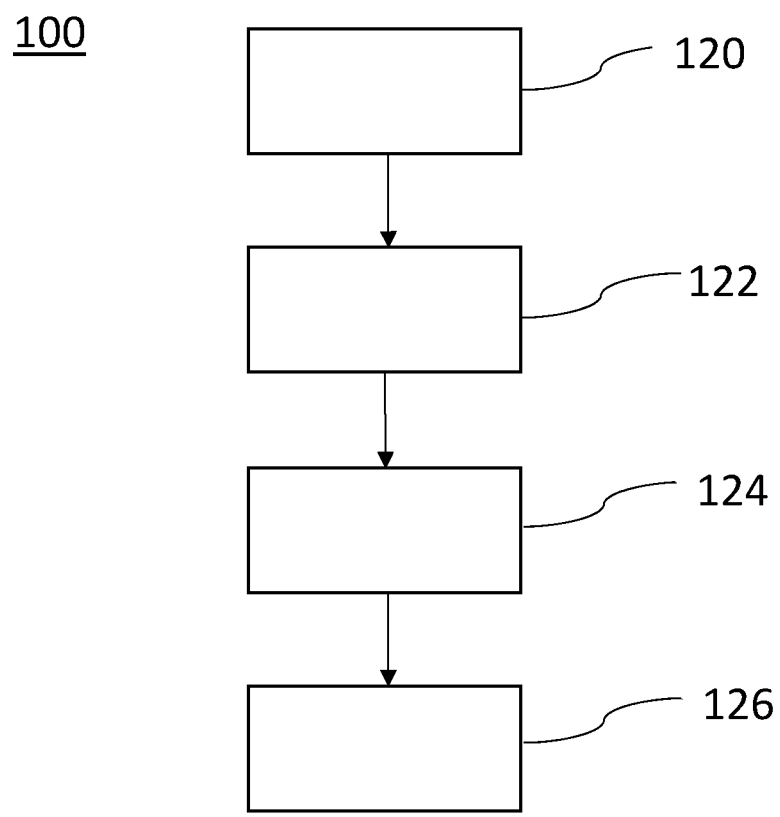
FIG. 4 shows a flow chart for adapting a triggering algorithm of a personal restraint device.

FIG. 4 shows a flow chart of a method 100 for adapting a triggering algorithm of a personal restraint device of a vehicle 1 on the basis of a detected vehicle interior state of the vehicle 1 according to another embodiment. The method 100 essentially corresponds to the method 100 described in FIG. 2, whereby the method 100 according to FIG. 4 comprises some further aspects.

In step 120 key points 7 of a vehicle occupant 6 are detected by an optical sensor device, wherein the optical sensor device is a combination of an IR camera 4 and a 3D camera 3, and wherein 2D key points of the vehicle occupant 6 detected by the IR camera 4 are converted into 3D key points 7 of the vehicle occupant 6 by fusing the information provided by the 3D camera 3. Furthermore, a mobile object held by the vehicle occupant 6 is detected by the IR camera 4.

In step 122 a vehicle occupant posture of the vehicle occupant 6 is ascertained based on the connection of the detected key points 7 to a skeleton-like representation of body parts of the vehicle occupant 6, wherein the skeleton-like representation reflects the relative position and orientation of individual body parts of the vehicle occupant 6.

In step 124 a future vehicle occupant posture of the vehicle occupant 6 is predicted based on a predicted future position of at least one key point 7. The predicted future position of at least one key point 7 is estimated based on a calculated future vectorial key point velocity, wherein the future vectorial key point velocity is formed by a vector sum of an estimated vectorial key point velocity, a current vectorial vehicle velocity multiplied with a first scalar parameter derived from a signal of a crash sensor and a current vectorial colliding target velocity multiplied with a second scalar parameter derived from the signal of another crash sensor. In this way, the future vectorial key point velocity is calculated by the following formula:

$$\overrightarrow{v_{KPt_{n+1}}} = \overrightarrow{v_{KPt_{n+1Est}}} + (\alpha) * \overrightarrow{v_{Vehicle}} + (\beta) * \overrightarrow{v_{CT}},$$

wherein $\overrightarrow{v_{KPt_{n+1}}}$ is the future vectorial key point velocity, $\overrightarrow{v_{KPt_{n+1Est}}}$ is the estimated future vectorial key point velocity, ($\alpha$) is the first scalar parameter derived from a signal of a crash sensor, $\overrightarrow{v_{Vehicle}}$ is the current vectorial vehicle velocity, ($\beta$) is a second scalar parameter derived from a signal of another crash sensor and $\overrightarrow{v_{CT}}$ is a current vectorial colliding target velocity.

The first scalar parameter and the second scalar parameter are each determined by also taking into account the vehicle size and the vehicle weight of the vehicle 1. The vectorial colliding target velocity is derived from a signal of a surrounding sensor of the vehicle 1, like a radar sensor, a lidar sensor, an ultrasonic sensor or a surrounding camera.

This will enable dynamic key point tracking and particularly precise predicting of the future key point position and therefore precise predicting a future vehicle occupant posture.

Furthermore, a future mobile object state is predicted, wherein the predicted future mobile object state comprises a future position of the mobile object inside the vehicle interior 5 relative to the steering wheel, a future velocity of the mobile object and a future orientation of the mobile object. The predicted future position of the mobile object is estimated based on a calculated future vectorial mobile object velocity, wherein the future vectorial mobile object velocity is formed by a vector sum of an estimated vectorial mobile object velocity, the current vectorial vehicle velocity multiplied with the first scalar parameter and the current vectorial colliding target velocity multiplied with the second scalar parameter. In this way, the future vectorial mobile object velocity is calculated by the following formula:

$$\vec{v}_{Obj t_{n+1}} = \vec{v}_{Obj t_{n+1Est}} + (\alpha)^* \vec{v}_{Vehicle} + (\beta)^* \vec{v}_{CT},$$

wherein $\vec{v}_{KPt_{n+1}}$ is the future vectorial mobile object velocity, $\vec{v}_{KPt_{n+1Est}}$ is the estimated future vectorial mobile object velocity, ($\alpha$) is the first scalar parameter derived from a signal of a crash sensor, $\vec{v}_{Vehicle}$ is the current vectorial vehicle velocity, ($\beta$) is the second scalar parameter derived from the signal of another crash sensor and $\vec{v}_{CT}$ is the current vectorial colliding target velocity.

The first scalar parameter and the second scalar parameter are each determined by also taking into account the vehicle size and the vehicle weight of the vehicle 1. The vectorial colliding target velocity is derived from a signal of a surrounding sensor of the vehicle 1, like a radar sensor, a lidar sensor, an ultrasonic sensor or a surrounding camera.

This will enable dynamic mobile object tracking and particularly precise predicting of the future mobile object position.

In step 126 the triggering algorithm of the personal restraint device is modified based on the predicted future posture of the vehicle occupant 6 and the predicted future mobile object state.

In this way, also a mobile object held by the vehicle occupant 6 is taken into account and so a more accurate determination of the vehicle interior state and therefore further maximization of protection of the vehicle occupant 6 in the event of a collision or crash can be reached.

We claim:

1. A method for adapting a triggering algorithm of a personal restraint device of a vehicle on the basis of a detected vehicle interior state of the vehicle, the method comprising:
   detecting of key points of a vehicle occupant by an optical sensor device;
   ascertaining a vehicle occupant posture of the vehicle occupant based on the connection of the detected key points to a skeleton-like representation of body parts of the vehicle occupant, wherein the skeleton-like representation reflects the relative position and orientation of individual body parts of the vehicle occupant;
   predicting a future vehicle occupant posture of the vehicle occupant based on a predicted future position of at least one of the key points; and
   modifying the triggering algorithm of the personal restraint device based on the predicted future posture of the vehicle occupant.

2. The method according to claim 1, further comprising:
   detecting of a mobile object held by the vehicle occupant by the optical sensor device;
   predicting a future mobile object state; and
   modifying the triggering algorithm of the personal restraint device based on the predicted future posture of the vehicle occupant and the predicted future mobile object state.

3. The method according to claim 2, wherein the predicted future mobile object state comprises at least one of a future position of the mobile object inside the vehicle interior, a future velocity of the mobile object, or a future orientation of the mobile object.

4. The method according to claim 2, further comprising:
   correlating the position and/or movement of the mobile object with respect to the position and/or movement of the key points representing the vehicle occupant wrists;
   determining from the correlation which hand of the vehicle occupant is holding the mobile object.

5. The method according to claim 1, wherein the predicted future position of at least one of the key points is estimated based on at least one of a vehicle occupant size, a vehicle occupant seat position, a vehicle occupant seat backrest angle, a seat belt status, a vehicle velocity, or a vehicle acceleration, and wherein the vehicle occupant size is estimated based on the size of a body part of the vehicle occupant.

6. The method according to claim 2, wherein the predicted future state of the mobile object is estimated based on at least one of a vehicle occupant size, a vehicle occupant seat position, a vehicle occupant seat backrest angle, a seat belt status, a vehicle velocity, or a vehicle acceleration and wherein the vehicle occupant size is estimated based on the size of a body part of the vehicle occupant.

7. The method according to claim 1, wherein the predicted future position of at least one of the key points is estimated based on a calculated future vectorial key point velocity, wherein the future vectorial key point velocity is formed by a vector sum of an estimated vectorial key point velocity and a current vectorial vehicle velocity multiplied with a first scalar parameter derived from a signal of a crash sensor.

8. The method according to claim 7, wherein the future vectorial key point velocity is calculated by the formula $$\vec{v}_{KPt_{n+1}} = \vec{v}_{KPt_{n+1Est}} + (\alpha)^* \vec{v}_{Vehicle} + (\beta)^* \vec{v}_{CT},$$

wherein $\vec{v}_{KPt_{n+1}}$ is the future vectorial key point velocity, $\vec{v}_{KPt_{n+1Est}}$ is the estimated future vectorial key point velocity, ($\alpha$) is the first scalar parameter derived from a signal of a crash sensor, $\vec{v}_{Vehicle}$ is the current vectorial vehicle velocity, ($\beta$) is a second scalar parameter derived from a signal of a crash sensor and $\vec{v}_{CT}$ is a current vectorial colliding target velocity.

9. The method according to claim 2, wherein the predicted future position of the mobile object is estimated based on a calculated future vectorial mobile object velocity, wherein the future vectorial mobile object velocity is formed by a vector sum of an estimated vectorial mobile object velocity and a current vectorial vehicle velocity multiplied with a first scalar parameter derived from a signal of a crash sensor.

10. The method according to claim 9, wherein the future vectorial mobile object velocity is calculated by the formula $$\vec{v}_{Obj t_{n+1}} = \vec{v}_{Obj t_{n+1Est}} + (\alpha)^* \vec{v}_{Vehicle} + (\beta)^* \vec{v}_{CT},$$

wherein $\vec{v}_{Obj t_{n+1}}$ is the future vectorial mobile object velocity, $\vec{v}_{KPt_{n+1Est}}$ is the estimated future vectorial mobile object velocity, ($\alpha$) is the first scalar parameter derived from a signal of a crash sensor, $\vec{v}_{Vehicle}$ is the current vectorial vehicle velocity, ($\beta$) is a second scalar parameter derived from a signal of a crash sensor and $\vec{v}_{CT}$ is a current vectorial colliding target velocity.

11. The method according to claim 2, wherein the detecting of key points of the vehicle occupant is made in using at least an IR camera and a 3D camera.

12. The method according to claim 11, wherein 2D key points of the vehicle occupant detected by the IR camera are converted into 3D key points of the vehicle occupant by fusing the information provided by the 3D camera, and wherein the ascertaining of the vehicle occupant posture of the vehicle occupant is based on the 3D key points of the vehicle occupant.

13. The method according to claim 12, wherein the detecting of the mobile object held by the vehicle occupant is made in using only the IR camera.

14. The method according to claim 1, wherein the key points of the vehicle occupant are the vehicle occupant skeleton joints.

15. A control device for adapting a triggering algorithm of a personal restraint device of a vehicle on the basis of a detected vehicle interior state of the vehicle, wherein the control device is configured to:
- detect key points of a vehicle occupant by an optical sensor device;
- ascertain a vehicle occupant posture of the vehicle occupant based on the connection of the detected key points to a skeleton-like representation of body parts of the vehicle occupant, wherein the skeleton-like representation reflects the relative position and orientation of individual body parts of the vehicle occupant;
- predict a future vehicle occupant posture of the vehicle occupant based on a predicted future position of at least one of the key points; and
- modify the triggering algorithm of the personal restraint device based on the predicted future posture of the vehicle occupant.

* * * * *